US009479032B2

United States Patent
Kato et al.

(10) Patent No.: US 9,479,032 B2
(45) Date of Patent: Oct. 25, 2016

(54) ROTARY ELECTRIC MACHINE HAVING NON-OVERLAPPING POWER INTERCONNECTING PART

(75) Inventors: Masaki Kato, Chiyoda-ku (JP); Masahiko Fujita, Chiyoda-ku (JP); Kazuyasu Sakamoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 266 days.

(21) Appl. No.: 13/877,401

(22) PCT Filed: Jan. 6, 2011

(86) PCT No.: PCT/JP2011/050077
§ 371 (c)(1),
(2), (4) Date: Apr. 2, 2013

(87) PCT Pub. No.: WO2012/093476
PCT Pub. Date: Jul. 12, 2012

(65) Prior Publication Data
US 2013/0187497 A1    Jul. 25, 2013

(51) Int. Cl.
*H02K 11/00* (2016.01)
*H02K 5/22* (2006.01)
*H02K 11/04* (2016.01)

(52) U.S. Cl.
CPC .......... *H02K 11/046* (2013.01); *H02K 5/225* (2013.01); *H02K 11/048* (2013.01)

(58) Field of Classification Search
CPC .............. H02K 11/0068; H02K 11/00–11/40
USPC ........................................................ 310/68 D
See application file for complete search history.

(56) References Cited

U.S. PATENT DOCUMENTS 5,194,772 A * 3/1993 Matsushita ............ H02K 5/225
                                                                310/68 D
7,081,694 B2 * 7/2006 Hans ............................... 310/71
(Continued)

FOREIGN PATENT DOCUMENTS

JP    2004-274992 A    9/2004
JP    2008-136333 A    6/2008
(Continued)

OTHER PUBLICATIONS

Japanese Office Action, (Decision of Final Rejection) dated Mar. 25, 2014, Patent Application No. 2012-551771.
International Search Report for PCT/JP2011/050077 dated Mar. 15, 2011.

*Primary Examiner* — Thomas Truong
(74) *Attorney, Agent, or Firm* — Sughrue Mion, PLLC (57) ABSTRACT

The rotary electric machine main body includes: a stator; a rotor that includes a rotating shaft and that is rotatable relative to the stator; and a supporting body that supports the stator and the rotor. The controlling apparatus includes a power circuit portion that is disposed around the rotating shaft, and that converts electric power that is received from the rotary electric machine main body or electric power that is supplied to the rotary electric machine main body between alternating current and direct current. The power circuit portion includes: a power module; and an electric power interconnecting part that includes a conductor that is connected to a terminal of the power module. The electric power interconnecting part is disposed so as to avoid overlapping with a region of the power module when the power circuit portion is viewed in an axial direction of the rotating shaft.

4 Claims, 6 Drawing Sheets

(56) References Cited

U.S. PATENT DOCUMENTS 7,362,001 B2 * 4/2008 Kusumi .................... 290/31
7,872,383 B2   1/2011 Dubuc et al.

FOREIGN PATENT DOCUMENTS

| | | |
|---|---|---|
| JP | 2008-543261 A | 11/2008 |
| JP | 2009-130201 A | 6/2009 |

* cited by examiner

ROTARY ELECTRIC MACHINE HAVING NON-OVERLAPPING POWER INTERCONNECTING PART

CROSS REFRENCE TO RELATED APPLICATIONS

This application is a National Stage of International Application No. PCT/JP2011/050077Filed Jan. 6, 2011, the contents of which are incorporated herein by reference in their entirety.

TECHNICAL FIELD

The present invention relates to a rotary electric machine in which a controlling apparatus is mounted onto a rotary electric machine main body.

BACKGROUND ART

Rotary electric machines in which a controlling apparatus is mounted onto a rotary electric machine main body are known conventionally. The controlling apparatus has: a plurality of power modules that control electric power from the rotary electric machine main body and a battery to adjust input and output of the rotary electric machine; and an electric power interconnecting part that includes a plurality of terminals that are connected to the respective power modules. The electric power interconnecting part is disposed at a position that overlaps with the respective power modules when viewed along a shaft axis of the rotary electric machine main body (see Patent Literature 1).

CITATION LIST

Patent Literature

[Patent Literature 1]
Japanese Patent Publication No. 2008-543261 (Gazette)

SUMMARY OF THE INVENTION

Problem to be Solved by the Invention

However, because the electric power interconnecting part and the respective power modules are disposed at positions that overlap with each other in an axial direction of the rotary electric machine main body, axial dimensions of the rotary electric machine are increased.

The present invention aims to solve the above problems and an object of the present invention is to provide a rotary electric machine in which axial dimensions can be reduced.

Means for Solving the Problem

In order to achieve the above object, according to one aspect of the present invention, there is provided a rotary electric machine including: a rotary electric machine main body including: a stator; a rotor that includes a rotating shaft and that is rotatable relative to the stator; and a supporting body that supports the stator and the rotor; and a controlling apparatus including a power circuit portion that is disposed around the rotating shaft, and that converts electric power that is received from the rotary electric machine main body or electric power that is supplied to the rotary electric machine main body between alternating current and direct current, the controlling apparatus being disposed on the rotary electric machine main body, the power circuit portion including: a power module that includes a switching element; and an electric power interconnecting part that includes a conductor that is connected to a terminal of the power module, the electric power interconnecting part being disposed so as to avoid overlapping with a region of the power module when the power circuit portion is viewed in an axial direction of the rotating shaft.

Effects of the Invention

In a rotary electric machine according to the present invention, because an electric power interconnecting part that includes respective conductors that are separately connected to terminals of a power module is disposed so as to avoid overlapping with the region of the power module when the power circuit portion is viewed in the axial direction of the rotating shaft, the electric power interconnecting part can be disposed such that the electric power interconnecting part overlaps with the power module when the power circuit portion is viewed in a direction that is perpendicular to the shaft axis of the rotating shaft. Axial dimensions of the power circuit portion can thereby be reduced, enabling overall axial dimensions of the rotary electric machine to be reduced.

DESCRIPTION OF EMBODIMENTS

Preferred embodiments of the present invention will now be explained with reference to the drawings.

Embodiment 1

Figure 1:
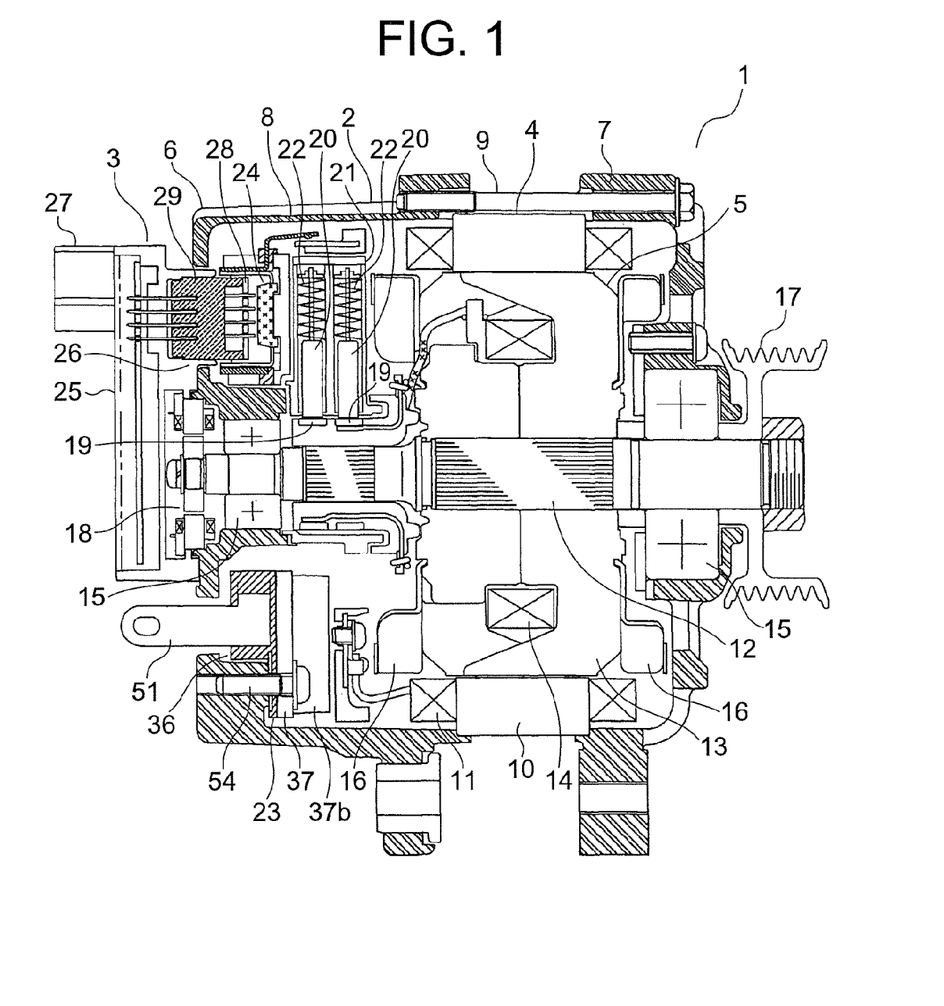
FIG. 1 is a cross section that shows a rotary electric machine according to Embodiment 1 of the present invention.

FIG. 1 is a cross section that shows a rotary electric machine according to Embodiment 1 of the present invention. In the figure, a rotary electric machine 1 is a control apparatus-integrated rotary electric machine that has: a rotary electric machine main body 2; and a controlling apparatus 3 that is mounted to the rotary electric machine main body 2. In this example, the rotary electric machine 1 is an alternating-current generator-motor (or motor generator).

The dynamoelectric machine main body 2 has: a tubular stator 4; a rotor 5 that is disposed inside the stator 4, and that is rotatable relative to the stator 4; and a case (a supporting body) 6 that supports the stator 4 and the rotor 5.

The case 6 has: a front bracket 7 and a rear bracket 8 that hold the stator 4 in the axial direction of the rotor 5; and a plurality of fastening bolts 9 that fasten between the front bracket 7 and the rear bracket 8. The front bracket 7 and the rear bracket 8 are made of metal.

The stator 4 has: a tubular stator core 10 to which the front bracket 7 and the rear bracket 8 are each fixed; and a stator winding (an armature winding) 11 that is disposed in the stator core 10.

The rotor 5 has: a rotating shaft 12 that is disposed on an axis of the rotor 5; a rotor core 13 that is fixed to an intermediate portion of the rotating shaft 12; and a rotor winding (a field winding) 14 that is disposed in the rotor core 13.

The rotating shaft 12 passes through the front bracket 7 and the rear bracket 8. The rotating shaft 12 is rotatably supported in both the front bracket 7 and the rear bracket 8 by means of bearings 15.

An outer circumferential portion of the rotor core 13 faces an inner circumferential portion of the stator 4. Ventilating cooling fans 16 that are rotated together with the rotor 5 are disposed on the rotor core 13.

A pulley 17 is fixed to an end portion of the rotating shaft 12 near the front bracket 7. A transmitting belt (not shown) that operates interdependently with a rotating shaft of an engine is wound around the pulley 17. A rotational position detecting sensor 18 that generates a signal that corresponds to rotation of the rotating shaft 12 is disposed on an end portion of the rotating shaft 12 near the rear bracket 8. In addition, a plurality of slip rings 19 that are electrically connected to the rotor winding 14 are disposed on a portion of the rotating shaft 12 between the rotor core 13 and the rotational position detecting sensor 18. The slip rings 19 are annular electroconductive members that surround outer circumferential portions of the rotating shaft 12.

Electroconductive brushes 20 for supplying a field current to the slip rings 19 for generating a magnetic field in the rotor 5 respectively contact the slip rings 19. A brush holder 21 that guides the brushes 20 in a direction of separation from and contact with the respective slip rings 19 is disposed on the rear bracket 8. Compressed springs 22 that separately force the respective brushes 20 in the direction of contact with the respective slip rings 19 are disposed in the brush holder 21. The respective brushes 20 are pressed against the slip rings 19 by the forces from the compressed springs 22. The slip rings 19 slide on the brushes 20 when the rotor 5 is rotated.

The controlling apparatus 3 is supported by the rear bracket 8. The controlling apparatus 3 has: a power circuit portion 23 that is electrically connected to the stator winding 11; a field circuit portion 24 that adjusts and supplies electric power from a battery (a direct-current power supply) to the rotor winding 14 as a field current; a controlling circuit portion 25 that controls both the power circuit portion 23 and the field circuit portion 24; and a signal relaying apparatus 26 for transmitting and receiving control signals between the power circuit portion 23 and the controlling circuit portion 25, and between the field circuit portion 24 and the controlling circuit portion 25.

The signal from the rotational position detecting sensor 18 is sent to the controlling circuit portion 25. An external connection connector 27 for transmitting and receiving signals to and from external equipment (an engine control unit, for example) is disposed on the controlling circuit portion 25. The controlling circuit portion 25 controls the field circuit portion 24 and the power circuit portion 23 based on respective information from the external equipment and the rotational position detecting sensor 18.

The field circuit portion 24 adjusts the field current to the rotor winding 14 under control from the controlling circuit portion 25. The field current that has been adjusted by the field circuit portion 24 is supplied to the rotor winding 14 in the rotor 5. A magnetic field is thereby generated in the rotor 5.

The power circuit portion 23 converts electric power that is received from the stator winding 11 (the rotary electric machine main body 2) or electric power that is supplied to the stator winding 11 (the rotary electric machine main body 2) between alternating current and direct current under control from the controlling circuit portion 25. Specifically, the power circuit portion 23 converts the direct-current power from the battery to alternating-current power and supplies it to the stator winding 11, and converts the alternating-current power from the stator winding 11 to direct-current power and supplies it to the battery, under control from the controlling circuit portion 25.

The signal relaying apparatus 26 has: a signal relaying part 28 in which signal wiring that is electrically connected to both the power circuit portion 23 and the field circuit portion 24 is disposed; and a signal relaying connector 29 that is disposed on the signal relaying part 28, and that is connected to the controlling circuit portion 25. Transmitting and receiving of signals between the power circuit portion 23 and the controlling circuit portion 25 and between the field circuit portion 24 and the controlling circuit portion 25 are performed by means of the signal relaying apparatus 26.

Figure 2:
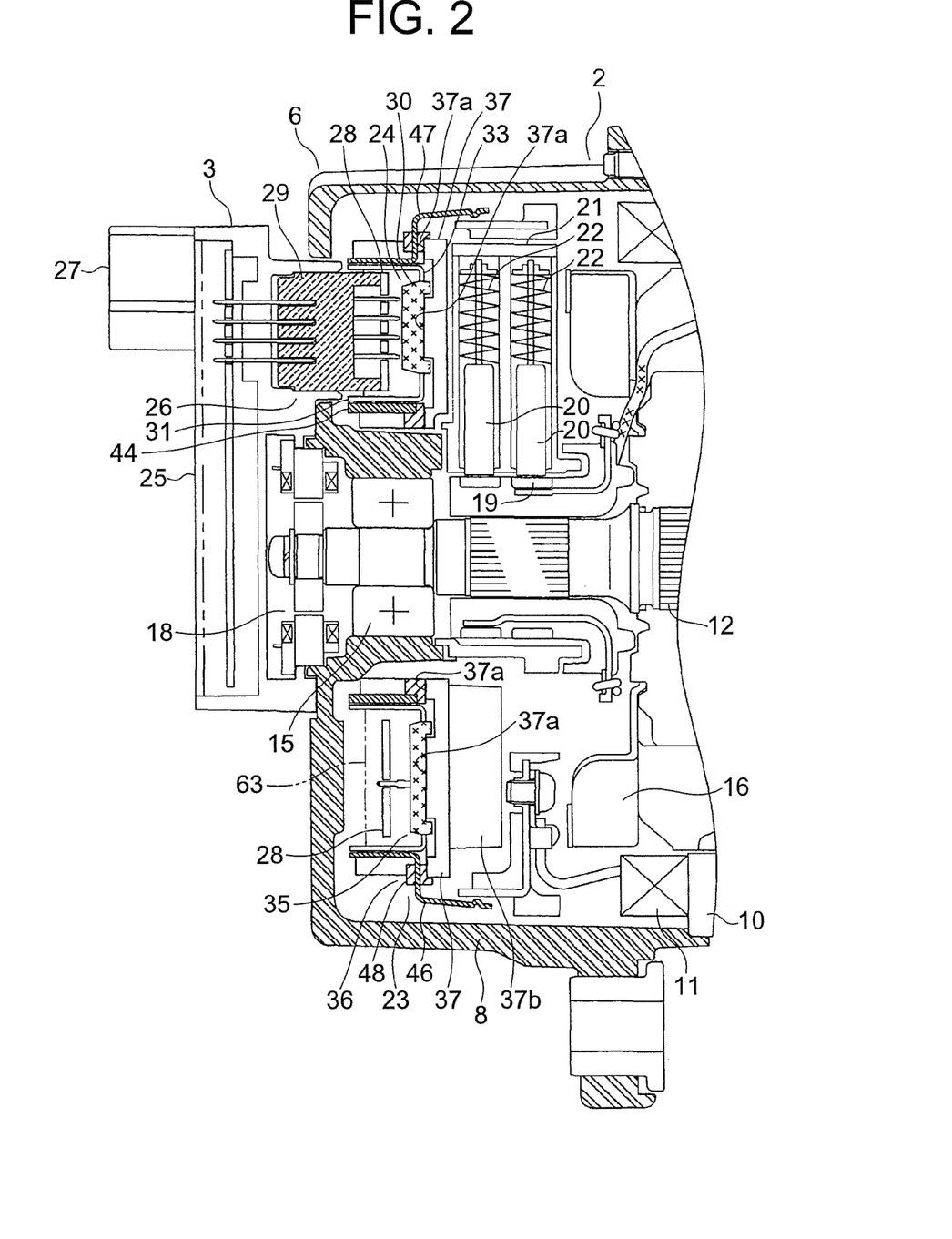
FIG. 2 is a cross section that shows a portion at a rear end of the rotary electric machine in FIG. 1.
Figure 3:
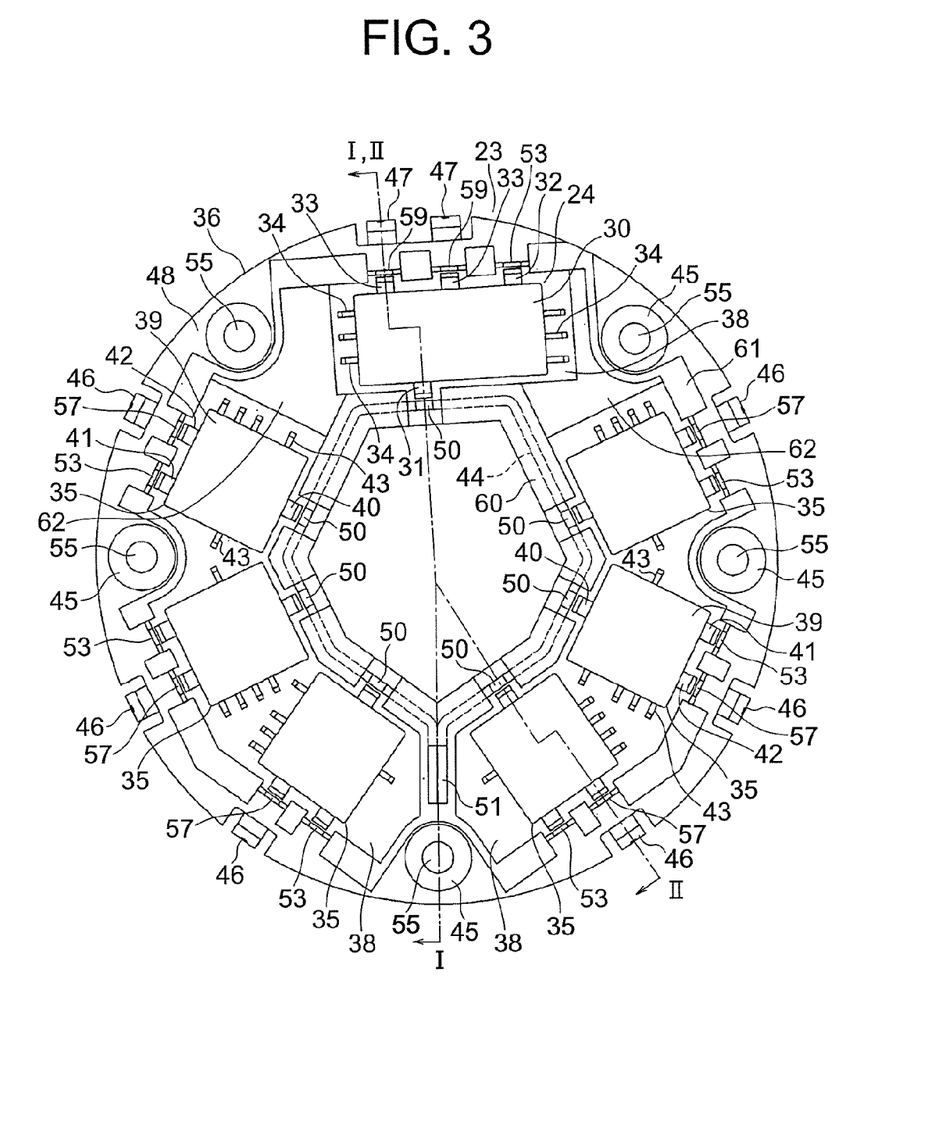
FIG. 3 is a front elevation that shows a state when a power circuit portion and a field circuit portion are viewed in an axial direction of a rotating shaft from FIG. 2.

FIG. 2 is a cross section that shows a portion at a rear end of the rotary electric machine 1 in FIG. 1. FIG. 3 is a front elevation that shows a state when the power circuit portion 23 and the field circuit portion 24 are viewed in an axial direction of a rotating shaft 12 from FIG. 2. Moreover, FIG. 1 is a cross section that is taken along line I-I in FIG. 3, and FIG. 2 is a cross section that is taken along line II-II in FIG. 3.

In the figures, the power circuit portion 23 and the field circuit portion 24 are disposed inside the rear bracket 8. The power circuit portion 23 and the field circuit portion 24 are disposed around the rotating shaft 12.

The field circuit portion 24 has: a field circuit portion main body 30 that has a flat rectangular parallelepipedic shape; and a positive terminal 31, a negative terminal 32, field terminals 33, and a plurality of signal terminals 34 that protrude from respective side surfaces of the field circuit portion main body 30. The field circuit portion main body 30 is disposed so as to have a thickness direction that is oriented in the axial direction of the rotating shaft 12. Among four side surfaces of the field circuit portion main body 30, the positive terminal 31 is disposed on a side surface that is close to the rotating shaft 12, the negative terminal 32 and the field terminals 33 are disposed on a side surface that is away from the rotating shaft 12, and the signal terminals 34 are disposed on the remaining two side surfaces.

The power circuit portion 23 is an annular apparatus that surrounds the rotating shaft 12. The power circuit portion 23 has: a plurality of (in this example, six) power modules 35; an electric power interconnecting part 36 that includes respective power wiring for each of the power modules 35 and the field circuit portion 24; and an annular heatsink 37 onto which the field circuit portion 24, the respective power modules 35, and the electric power interconnecting part 36 are each mounted (FIG. 2).

As shown in FIG. 2, the heatsink 37 is a flat member that is disposed so as to be perpendicular to the shaft axis of the rotating shaft 12. The heatsink 37 is supported by the rear bracket 8 so as to surround the rotating shaft 12. A surface of the heatsink 37 on an opposite side from the rotor core 13 is a common mounting surface 37a onto which the field circuit portion 24, the respective power modules 35, and the electric power interconnecting part 36 are mounted. The mounting surface 37a of the heatsink 37 is a flat surface that is perpendicular to the shaft axis of the rotating shaft 12. Cooling fins 37b are disposed on a surface of the heatsink 37 near the rotor core 13. Heat from the field circuit portion 24, the respective power modules 35, and the electric power interconnecting part 36 is radiated to external air by means of the heatsink 37 and the fins 37b.

As shown in FIG. 3, a plurality of opening portions 38 in which the field circuit portion 24 or the respective power modules 35 are disposed are disposed on the electric power interconnecting part 36. The field circuit portion 24 and the respective power modules 35 are mounted onto the mounting surface 37a of the heatsink 37 so as to be disposed in the opening portions 38. Consequently, the electric power interconnecting part 36 is disposed so as to avoid overlapping with the respective regions of the field circuit portion 24 and the respective power modules 35 when the power circuit portion 23 is viewed in the axial direction of the rotating shaft 12. In other words, the electric power interconnecting part 36 is disposed so as to be removed from the respective regions of the field circuit portion 24 and the respective power modules 35 so as not to overlap any region of the field circuit portion 24 and the respective power modules 35 when the power circuit portion 23 is viewed in the axial direction of the rotating shaft 12.

The field circuit portion 24 and the respective power modules 35 are disposed so as to be spaced apart from each other in a circumferential direction of the rotating shaft 12 so as to surround the rotating shaft 12. Each of the power modules 35 has: a module main body 39 that includes switching elements (power transistors, metal-oxide-semiconductor field-effect transistors (MOSFETs) or insulated gate bipolar transistors (IGBTs), for example) and has a flat rectangular parallelepipedic shape; and a positive terminal 40, a negative terminal 41, an AC terminal 42, and a plurality of signal terminals 43 that each protrude from the module main body 39. The power circuit portion 23 converts electric power between direct current and alternating current by repeating ON/OFF switching operations using the switching elements.

The module main body 39 is produced by the switching elements being integrated with an insulating resin by insert molding. The module main body 39 is disposed so as to have a thickness direction that is oriented in the axial direction of the rotating shaft 12. Among four side surfaces of the module main body 39, the positive terminal 40 is disposed on a side surface that is close to the rotating shaft 12, the negative terminal 41 and the AC terminal 42 are disposed on a side surface that is away from the rotating shaft 12, and the respective signal terminals 43 are disposed on the remaining two side surfaces.

The electric power interconnecting part 36 has: a positive busbar 44, a plurality of negative busbars 45, armature connecting terminals 46, and a plurality of field connecting terminals 47 that function as a plurality of conductors; and an insulating body 48 that is an insulating resin that holds the positive busbar 44, the negative busbars 45, the armature connecting terminals 46, and the field connecting terminals 47. The positive busbar 44, the negative busbars 45, the armature connecting terminals 46, and the field connecting terminals 47 are integrated with the insulating body 48 by insert molding. The positive busbar 44, the negative busbars 45, the armature connecting terminals 46, and the field connecting terminals 47 function as power wiring for each of the respective power modules 35 and the field circuit portion 24.

Figure 4:
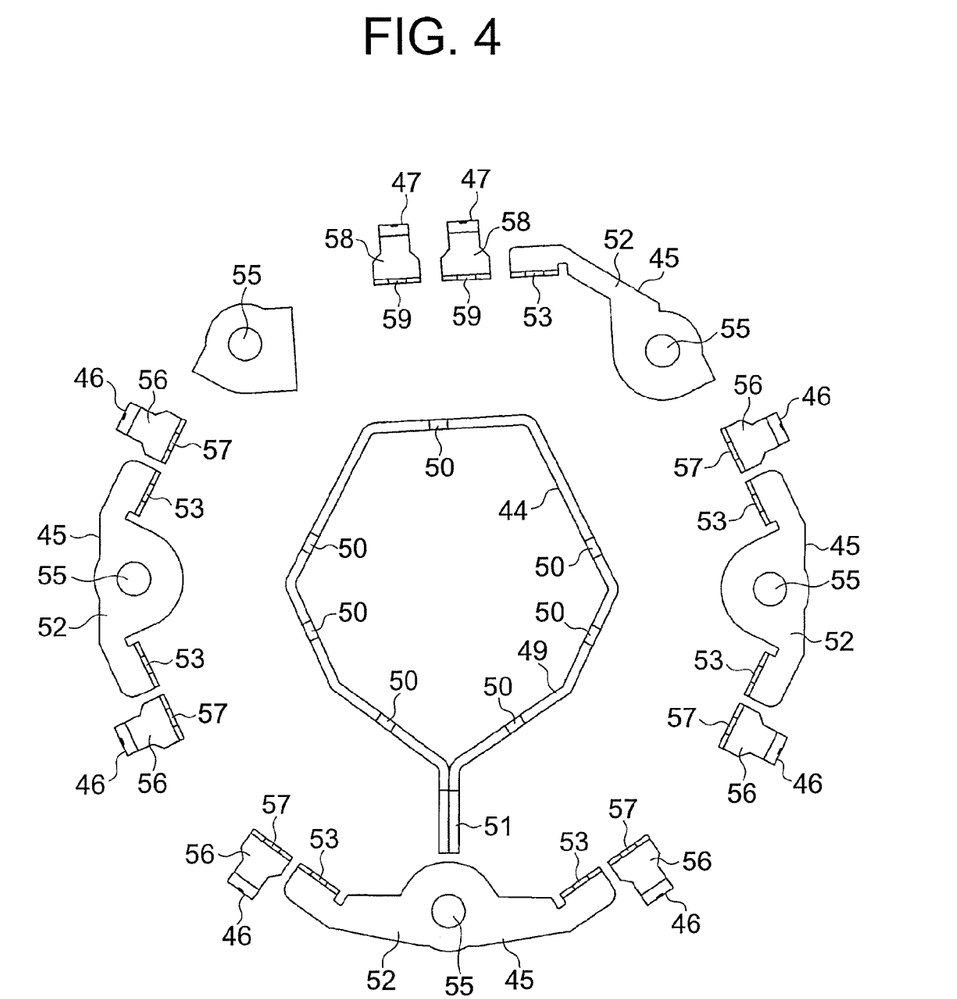
FIG. 4 is a front elevation that shows a positive busbar, negative busbars, armature connecting terminals, and field connecting terminals when an insulating body is removed from an electric power interconnecting part in FIG. 3.

Now, FIG. 4 is a front elevation that shows the positive busbar 44, the negative busbars 45, the armature connecting terminals 46, and the field connecting terminals 47 when the insulating body 48 is removed from the electric power interconnecting part 36 in FIG. 3. The positive busbar 44, the negative busbars 45, the armature connecting terminals 46, and the field connecting terminals 47 (the respective conductors 44, 45, 46, and 47) are disposed so as to be separated from each other when the electric power interconnecting part 36 is viewed in the axial direction of the rotating shaft 12. The positive busbar 44 is disposed at a position that is radially further inward than the field circuit portion 24 and each of the power modules 35. The negative busbars 45, the armature connecting terminals 46, and the field connecting terminals 47 are disposed at positions that are radially further outward than the field circuit portion 24 and each of the power modules 35.

The positive busbar 44 has: an annular portion 49 that surrounds the rotating shaft 12; a plurality of positive terminal connecting portions 50 that are disposed on the annular portion 49 so as to be spaced apart from each other, and to which the positive terminal 40 of each of the power modules 35 and the positive terminal 31 of the field circuit portion 24 are separately connected by welding, for example; and an electric power supply terminal portion 51 that is disposed on the annular portion 49, and that is electrically connected to the battery.

The respective positive terminal connecting portions 50 and the electric power supply terminal portion 51 protrude from the annular portion 49 in the axial direction of the rotating shaft 12. The positive terminals 40 of the respective power modules 35 and the positive terminal 31 of the field circuit portion 24 each extend parallel to the positive terminal connecting portions 50. The annular portion 49 is formed by bending a strip-shaped conductor such that a thickness direction becomes a radial direction. The positive busbar 44 is produced by bending into a tubular shape a strip-shaped conductor (a metal sheet) on which the respective positive terminal connecting portions 50 and the electric power supply terminal portion 51 are disposed and connecting end portions together. As shown in FIG. 3, the positive busbar 44 is integrated with the insulating body 48 in a state in which the respective positive terminal connecting portions 50 and the electric power supply terminal portion 51 are exposed from the insulating body 48.

Each of the negative busbars 45 has: a flat plate portion 52; and negative terminal connecting portions 53 that are disposed on the flat plate portion 52, and to which the negative terminals 41 of the respective power modules 35 or the negative terminal 32 of the field circuit portion 24 are connected by welding, for example.

The negative terminal connecting portions 53 protrude from the flat plate portions 52 in the axial direction of the rotating shaft 12. The negative terminals 41 of the respective power modules 35 and the negative terminal 32 of the field circuit portion 24 each extend parallel to the negative terminal connecting portions 53. Bolt passage apertures 55 through which bolts 54 (FIG. 1) for fixing the power circuit portion 23 to the rear bracket 8 are passed are disposed on the flat plate portions 52. The negative busbars 45 are produced by bending flat metal segments. As shown in FIG. 3, the negative busbars 45 are integrated with the insulating body 48 in a state in which portions around the bolt passage apertures 55 (portions of the flat plate portions 52) and the negative terminal connecting portions 53 are exposed from the insulating body 48.

As shown in FIG. 1, the electric power interconnecting part 36 and the heatsink 37 are fastened mechanically together with the rear bracket 8 by the bolts 54. The negative busbars 45 are grounded to the rear bracket 8 by the portions around the bolt passage apertures 55 being fastened mechanically to the rear bracket 8 by the bolts 54.

The armature connecting terminals 46 have: terminal main body portions 56 that are electrically connected to the stator winding 11; and AC terminal connecting portions 57 that are disposed on the terminal main body portions 56, and that are connected to the AC terminals 42 of the power modules 35 by welding, for example. The armature connecting terminals 46 are produced by bending flat metal segments. The armature connecting terminals 46 are integrated with the insulating body 48 in a state in which portions of the terminal main body portions 56 and the AC terminal connecting portions 57 are exposed from the insulating body 48. The AC terminals 42 of the respective power modules 35 extend parallel to the AC terminal connecting portions 57.

The field connecting terminals 47 have: terminal main body portions 58 that are electrically connected to the rotor winding 14 by means of the brushes 20 and the slip rings 19; and field terminal connecting portions 59 that are disposed on the terminal main body portions 58, and that are connected to the field terminals 33 by welding, for example. The field connecting terminals 47 are produced by bending flat metal segments. The field connecting terminals 47 are integrated with the insulating body 48 in a state in which portions of the terminal main body portions 58 and the field terminal connecting portions 59 are exposed from the insulating body 48. The field terminals 33 of the field circuit portion 24 extend parallel to the field terminal connecting portions 59.

The insulating body 48 is formed into an annular shape such that the rotating shaft 12 passes through centrally. The opening portions 38 are disposed on the insulating body 48 so as to avoid the positive busbar 44, the negative busbars 45, the armature connecting terminals 46, and the field connecting terminals 47 (the respective conductors 44, 45, 46, and 47). As shown in FIG. 2, the electric power interconnecting part 36 is mounted onto the heatsink 37 in a state in which the insulating body 48 contacts the mounting surface 37a of the heatsink 37. The insulating body 48 is disposed at a position that overlaps with the respective regions of the power modules 35 and of the field circuit portion 24 when the power circuit portion 23 is viewed in a direction that is perpendicular to the shaft axis of the rotating shaft 12 (a radial direction). In other words, the insulating body 48, each of the power modules 35, and the field circuit portion 24 are disposed on a common plane that is perpendicular to the shaft axis of the rotating shaft 12.

As shown in FIG. 3, the insulating body 48 has: an inner wall portion 60 that is disposed at a position that is radially inside the opening portions 38 and that surrounds the rotating shaft 12; an outer wall portion 61 that is disposed at a position that is radially outside the opening portions 38 and that surrounds the respective power modules 35 and the field circuit portion 24 together; and flat wall portions 62 that are made thinner than the respective thicknesses of the inner wall portion 60 and the outer wall portion 61, and that join between the inner wall portion 60 and the outer wall portion 61 so as to form the opening portions 38. Recess portions that have the mounting surface 37a of the heatsink 37 as bottom surfaces are formed between the inner wall portion 60 and the outer wall portion 61 by the insulating body 48 being mounted onto the heatsink 37. The field circuit portion 24 and the respective power modules 35 are disposed in the recess portions that are formed between the inner wall portion 60 and the outer wall portion 61.

The signal relaying part 28 is disposed in a recess portion that is formed between the inner wall portion 60 and the outer wall portion 61 so as to face both the field circuit portion 24 and the respective power modules 35. The signal wiring of the signal relaying part 28 is connected to the signal terminals 34 of the field circuit portion 24 and to the signal terminals 43 of the respective power modules 35. The signal relaying connector 29 connects the signal wiring of the signal relaying part 28 and the controlling circuit portion 25.

As shown in FIG. 2, the recess portions that are formed between the inner wall portion 60 and the outer wall portion 61 are filled with an insulating filler (a resin, for example) 63. The field circuit portion 24, the signal relaying part 28, and the respective power modules 35 are thereby embedded in the filler 63.

Next, operation will be explained. The power circuit portion 23 and the field circuit portion 24 are controlled by the controlling circuit portion 25 based on respective information from the rotational position detecting sensor 18 and external equipment.

During starting of the engine, direct-current power from the battery is supplied to both the power circuit portion 23 and the field circuit portion 24. Operation that adjusts the direct-current power from the battery into a field current is performed in the field circuit portion 24 under control from the controlling circuit portion 25. The field current from the field circuit portion 24 is supplied to the rotor winding 14 by means of the brushes 20 and the slip rings 19. A direct current magnetic field is thereby generated in the rotor 5.

At the same time, switching operations are performed in the respective power modules 35 of the power circuit portion 23 under control from the controlling circuit portion 25. The direct-current power from the battery is thereby converted to alternating-current power. The alternating-current power that is converted by the power circuit portion 23 is supplied to the stator winding 11. A rotating magnetic field is thereby generated in the stator 4 to rotate the rotor 5. The pulley 17 is rotated due to the rotation of the rotor 5 to start the engine.

After starting the engine, torque from the engine is transmitted to the pulley 17. The rotor 5 is thereby rotated, inducing alternating-current power in the stator winding 11. At this point, switching operations are performed in the respective power modules 35 under control from the controlling circuit portion 25. The alternating-current power that is induced in the stator winding 11 is thereby converted to direct-current power. The direct-current power from the power circuit portion 23 is subsequently charged to the battery.

In a rotary electric machine 1 of this kind, because an electric power interconnecting part 36 that includes respective conductors 44, 45, and 46 that are separately connected to terminals 40, 41, and 42 of respective power modules 35 is disposed so as to avoid overlapping with respective regions of respective power modules 35 when a power circuit portion 23 is viewed in an axial direction of a rotating shaft 12, the electric power interconnecting part 36 can be disposed such that the electric power interconnecting part 36 overlaps with the respective power modules 35 when the power circuit portion 23 is viewed in a direction that is perpendicular to a shaft axis of the rotating shaft 12. Axial dimensions of the power circuit portion 23 can thereby be reduced, enabling overall axial dimensions of the rotary electric machine 1 to be reduced.

Because an insulating body 48 that holds the respective conductors 44 through 47 is held by a heatsink 37, reductions in the strength of the insulating body 48 itself can be achieved by supporting the insulating body 48 by the heatsink 37, which has high strength. Volume of the insulating body 48 can thereby be reduced, enabling reductions in the weight of the electric power interconnecting part 36 to be achieved. Consequently, reductions in the weight of the rotary electric machine 1 can be achieved.

Because respective conductors 44 through 47 of the electric power interconnecting part 36 are disposed so as to be separated from each other when the power circuit portion 23 is viewed in the axial direction of the rotating shaft 12, short-circuiting with each other can be prevented, enabling securing of dielectric strength of the electric power interconnecting part 36 to be facilitated. Because the respective conductors 44 through 47 do not overlap in the axial direction of the rotating shaft 12, axial dimensions of the electric power interconnecting part 36 itself can be reduced. In addition, because the respective conductors 44 through 47 do not overlap in the axial direction of the rotating shaft 12, it is no longer necessary to interpose electrical insulators between the respective conductors 44 through 47 when the respective conductors 44 through 47 and the insulating resin are integrated by insert molding, enabling simplification of the shape of the respective conductors 44 through 47, and also enabling manufacturing of the electric power interconnecting part 36 to be facilitated.

Because a positive busbar 44 is disposed at a position that is radially further inward than the respective power modules 35, and negative busbars 45 are disposed at positions that are radially further outward than the respective power modules 35, distances between the positive busbar 44 and the negative busbars 45 can be increased. Thus, the possibility that the positive busbar 44 and the negative busbars 45 might short-circuit due to foreign matter or water, etc., can be reduced.

Because the positive busbar 44 has an annular portion 49 that is disposed so as to surround the rotating shaft 12 at a position that is radially further inward than the respective power modules 35, length of the positive busbar 44 can be shortened, enabling resistance values due to the length of the positive busbar 44 to be reduced. Consequently, the cross-sectional area of the positive busbar 44 can be reduced. Because the wiring points from the battery can be brought together at a single point, electric potential differences can be prevented from arising among the respective power modules 35, enabling errors in the excitation current flowing to the respective power modules 35 to be made less likely to occur.

Because armature connecting terminals 46 that are connected to AC terminals 42 of the power modules 35 are disposed at positions that are radially further outward than the power modules 35, electrical connections between the armature connecting terminals 46 and the stator winding 11 can be facilitated.

Because portions of the negative busbars 45 are exposed from the insulating body 48, and the exposed portions of the negative busbars 45 are grounded to the rear bracket 8 by being fastened mechanically to the rear bracket 8 by bolts 54, grounding of the negative busbars 45 to the rear bracket 8 and mounting of the electric power interconnecting part 36 onto the rear bracket 8 can be performed by common bolts 54. Thus, reductions in the number of parts can be achieved.

Because the electric power interconnecting part 36 is supported by the rear bracket 8 mechanically, strength of the electric power interconnecting part 36 itself can be lowered, enabling reductions in the weight of the power circuit portion 23 to be achieved.

Because recess portions that are formed between an inner wall portion 60 and an outer wall portion 61 that are included in the insulating body 48 are filled with a filler 63, and the field circuit portion 24, the signal relaying part 28, and the respective power modules 35 are embedded in the filler 63, environmental resistance and dielectric strength in the field circuit portion 24, in the signal relaying part 28, and in the respective power modules 35 can be improved.

Because the annular portion 49 is formed by bending a strip-shaped conductor such that a thickness direction becomes a radial direction, area of the positive busbar 44 when the electric power interconnecting part 36 is viewed in the axial direction of the rotating shaft 12 can be reduced, enabling area of the field circuit portion 24 and the respective power modules 35 that is placed in contact with the heatsink 37 to be increased. Temperature increases in the field circuit portion 24 and in the respective power modules 35 can thereby be suppressed.

Because the positive busbar 44 has positive terminal connecting portions 50 that extend parallel to positive terminals 31 and 40 in the axial direction of the rotating shaft 12, welding tools can be easily moved closer to the positive terminal connecting portions 50 from the axial direction of the rotating shaft 12, enabling welding between the positive terminals 31 and 40 and the positive terminal connecting portions 50 to be facilitated.

Because the negative busbar 45 has negative terminal connecting portions 53 that extend parallel to negative terminals 32 and 41 in the axial direction of the rotating shaft 12, welding tools can be easily moved closer to the negative terminal connecting portions 53 from the axial direction of the rotating shaft 12, enabling welding between the negative terminals 32 and 41 and the negative terminal connecting portions 53 to be facilitated.

Because the armature connecting terminals 46 have AC terminal connecting portions 57 that extend parallel to AC terminals 32 in the axial direction of the rotating shaft 12, and the field connecting terminals 47 have field terminal connecting portions 59 that extend parallel to field terminals 33 in the axial direction of the rotating shaft 12, welding tools can be easily moved closer to the AC terminal connecting portions 57 and the field terminal connecting portions 59 from the axial direction of the rotating shaft 12, enabling welding between the AC terminals 42 and the AC terminal connecting portions 57 and welding between the field terminals 33 and the field terminal connecting portions 59 to be facilitated.

Embodiment 2

Figure 5:
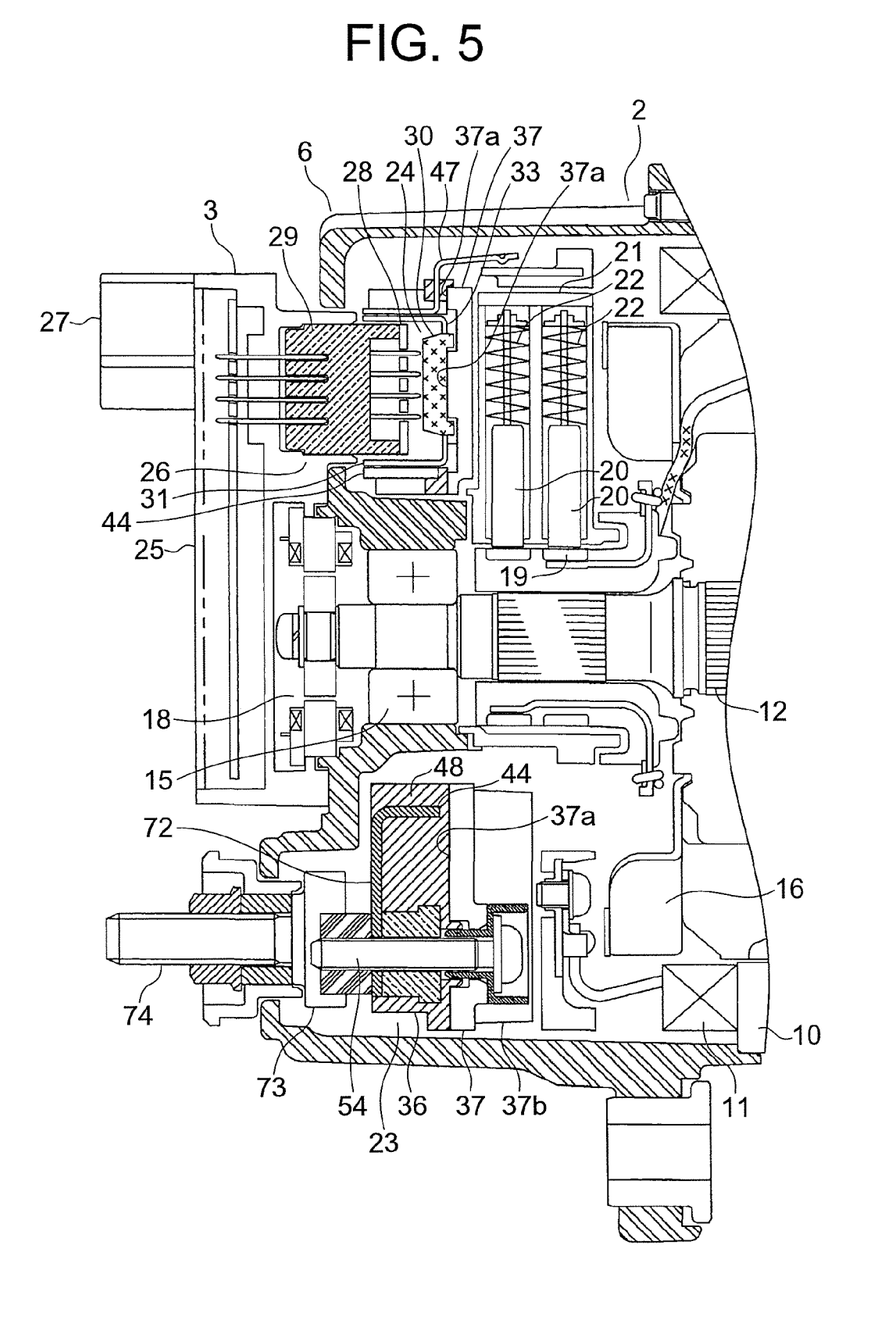
FIG. 5 is a cross section that shows a portion at a rear end of a rotary electric machine according to Embodiment 2 of the present invention.
Figure 6:
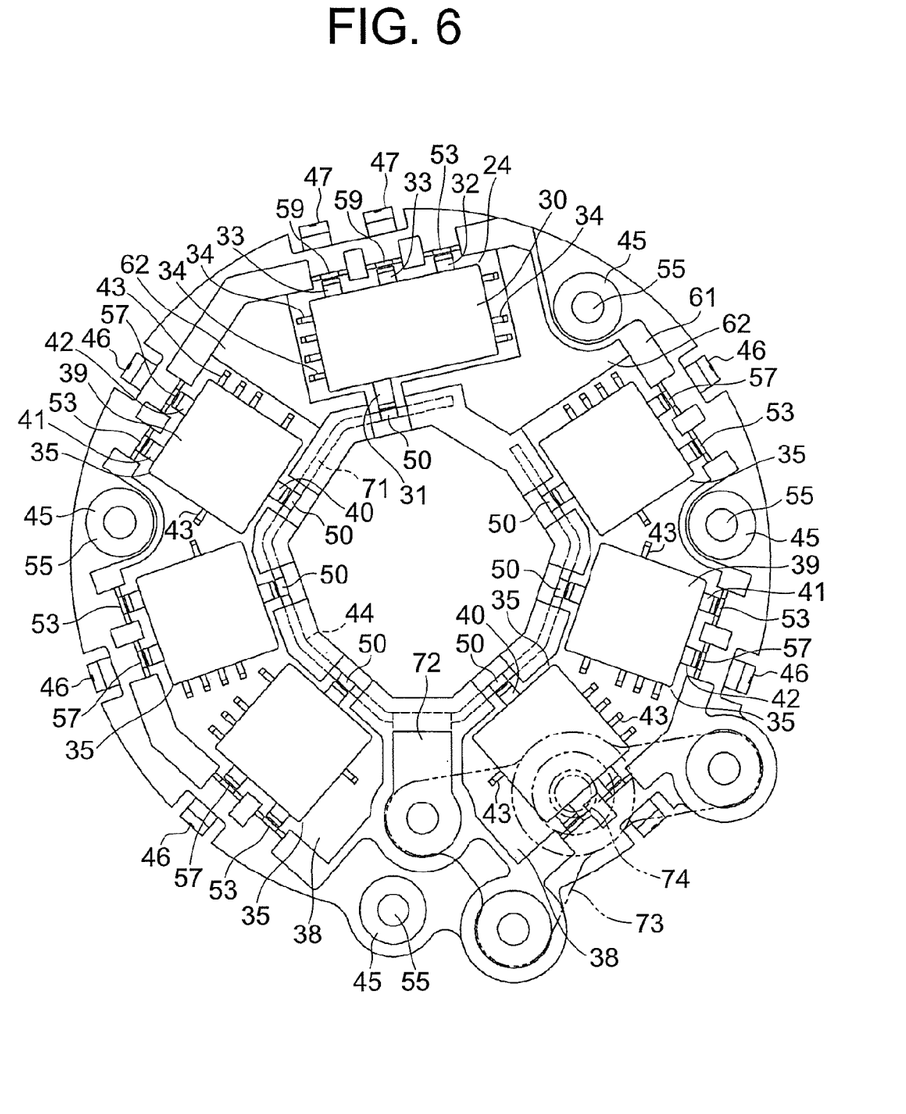
FIG. 6 is a front elevation that shows a state when a power circuit portion and a field circuit portion are viewed along a shaft axis of a rotating shaft in FIG. 5.

FIG. 5 is a cross section that shows a portion at a rear end of a rotary electric machine 1 according to Embodiment 2 of the present invention. FIG. 6 is a front elevation that shows a state when a power circuit portion 23 and a field circuit portion 24 are viewed along a shaft axis of a rotating shaft 12 in FIG. 5. In the figures, a positive busbar 44 has: an annular portion 71 that is disposed at a position that is radially further inward than a field circuit portion 24 and respective power modules 35; and a flat portion 72 that protrudes radially outward from the annular portion 71.

The annular portion 71 is disposed so as to surround a rotating shaft 12. The shape of the annular portion 71 is an incomplete annular shape (tubular shape) from which a portion is cut and removed. Positive terminal connecting portions 50 that are connected to positive terminals 31 and 40 protrude from the annular portion 71 in an axial direction of the rotating shaft 12. The flat portion 72 is disposed so as to be perpendicular to the shaft axis of the rotating shaft 12. The flat portion 72 is disposed in a gap that is formed by widening a distance between mutually adjacent power modules 35. The positive busbar 44 is produced by bending a strip-shaped metal sheet (conductor) on which a projection that constitutes the flat portion 72 is disposed.

A battery plate 73 is connected to the flat portion 72 mechanically and electrically. The battery plate 73 is disposed so as to be perpendicular to the shaft axis of the rotating shaft 12. The battery plate 73 is fixed to a heatsink 37 together with an electric power interconnecting part 36 by a plurality of bolts (fastening members) 54 in a state in which an insulating body 48 is interposed between the battery plate 73 and the heatsink 37. An electric power supply terminal portion 74 that protrudes in the axial direction of the rotating shaft 12, and that is electrically connected to a battery is disposed on the battery plate 73. In this example, the shape of the electric power supply terminal portion 74 is a bolt shape. The rest of the configuration is similar or identical to that of Embodiment 1.

In a rotary electric machine 1 of this kind, because an electric power supply terminal portion 74 is disposed on a battery plate 73 that is fixed to a heatsink 37 by a plurality of bolts 54, and a positive busbar 44 is connected to the battery plate 73 mechanically and electrically, the electric power supply terminal portion 74 that is electrically connected to the battery can be fixed firmly to the heatsink 37, enabling damage to the power circuit portion 23 due vibration of the rotary electric machine 1, or of the vehicle to which the rotary electric machine 1 is mounted, to be prevented. Improvements in reliability of the rotary electric machine 1 can thereby be achieved.

Moreover, in each of the above embodiments, the field circuit portion 24, the respective power modules 35, and the electric power interconnecting part 36 are mounted to the heatsink 37, which is separate from the rear bracket 8, but the field circuit portion 24, the respective power modules 35, and the electric power interconnecting part 36 may also be mounted onto the rear bracket 8 directly. In that case, a mounting surface that is perpendicular to the shaft axis of the rotating shaft 12 is formed on the rear bracket 8, and the field circuit portion 24, the respective power modules 35, and the electric power interconnecting part 36 are mounted onto the common mounting surface of the rear bracket 8. In this manner, the electric power interconnecting part 36 can also be disposed so as to avoid overlapping with the respective regions of the field circuit portion 24 and the respective power modules 35 when the power circuit portion 23 is viewed in an axial direction of a rotating shaft 12, enabling the axial dimensions of the rotary electric machine 1 to be reduced. The rear bracket 8 can also be made to function as a heatsink, enabling reductions in the number of parts to be achieved.

EXPLANATION OF NUMBERING

2 ROTARY ELECTRIC MACHINE MAIN BODY; 3 CONTROLLING APPARATUS; 4 STATOR; 5 ROTOR; 6 CASE (SUPPORTING BODY); 12 ROTATING SHAFT; 23 POWER CIRCUIT PORTION; 35 POWER MODULES; 36 ELECTRIC POWER INTERCONNECTING PART; 37 HEATSINK; 40 POSITIVE TERMINALS; 41 NEGATIVE TERMINALS; 42 AC TERMINALS; 44 POSITIVE BUSBAR (CONDUCTOR); 45 NEGATIVE BUSBARS (CONDUCTORS); 46 ARMATURE CONNECTING TERMINALS (CONDUCTORS); 48 INSULATING BODY; 49, 71 ANNULAR PORTION.

The invention claimed is:

1. A rotary electric machine comprising:
a rotary electric machine main body comprising:
a stator;
a rotor that includes a rotating shaft and that is rotatable relative to the stator; and
a supporting body that supports the stator and the rotor; and
a controlling apparatus comprising a power circuit portion that is disposed around the rotating shaft, and that converts electric power that is received from the rotary electric machine main body or electric power that is supplied to the rotary electric machine main body between alternating current and direct current, the controlling apparatus being disposed on the rotary electric machine main body,
the power circuit portion comprising:
a power module that includes a switching element; and
an electric power interconnecting part that includes conductors that are connected to terminals of the power module, and
the power module comprising:
a module main body; and
a positive terminal, a negative terminal and an AC terminal that each protrude from the module main body in the radial direction of the rotating shaft, and
the conductors of the electric power interconnecting part comprising:
a positive busbar that is connected to a positive terminal of the power module;
a negative busbar that is connected to a negative terminal of the power module; and
an armature connecting terminal that is connected to the AC terminal of the power module for electrical connection to the stator,
wherein the electric power interconnecting part is disposed so as to avoid overlapping with any region of the power module when the power circuit portion is viewed in an axial direction of the rotating shaft, wherein
the supporting body includes a rear bracket having a wall portion disposed in the axial direction on a side of the power module opposite the stator,
the electric power interconnecting part comprises a plurality of the conductors;
the conductors are disposed so as to be separated from each other when the power circuit portion is viewed in the axial direction of the rotating shaft,
the positive busbar is disposed at a position that is radially further inward than the power module;
the negative busbar is disposed at a position that is radially further outward than the power module, and
the positive busbar has an annular portion that is disposed so as to surround the rotating shaft.

2. A rotary electric machine according to claim 1, wherein the electric power interconnecting part further comprises an insulating body that holds the conductor; and
the power circuit portion further comprises a heatsink onto which the power module and the insulating body are mounted.

3. A rotary electric machine according to claim 1, wherein the armature connecting terminal is disposed at a position that is radially further outward than the power module.

4. A rotary electric machine according to claim 1, wherein
the conductors are integrated with an insulating body by insert molding;
a portion of the negative busbar is exposed from the insulating body; and
the exposed portion of the negative busbar is grounded to the supporting body by being fastened mechanically to the supporting body.

* * * * *